US012188378B2

(12) United States Patent
Ronchieri et al.

(10) Patent No.: US 12,188,378 B2
(45) Date of Patent: Jan. 7, 2025

(54) GLAND CONDENSER SKID SYSTEMS BY DIRECT CONTACT HEAT EXCHANGER TECHNOLOGY

(71) Applicant: NUOVO PIGNONE TECNOLOGIE—SRL, Florence (IT)

(72) Inventors: Andrea Ronchieri, Massa-Carrara (IT); Alessandro Szorenyi, Massa-Carrara (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 0 days.

(21) Appl. No.: 18/263,469

(22) PCT Filed: Jan. 28, 2022

(86) PCT No.: PCT/EP2022/025028
§ 371 (c)(1),
(2) Date: Jul. 28, 2023

(87) PCT Pub. No.: WO2022/167148
PCT Pub. Date: Aug. 11, 2022

(65) Prior Publication Data
US 2024/0084720 A1 Mar. 14, 2024

(30) Foreign Application Priority Data
Feb. 3, 2021 (IT) ........................ 102021000002366

(51) Int. Cl.

| | |
|---|---|
| ***F01K 11/02*** | (2006.01) |
| ***F01D 25/32*** | (2006.01) |
| ***F01K 9/00*** | (2006.01) |

(52) U.S. Cl.
CPC .............. *F01K 11/02* (2013.01); *F01D 25/32* (2013.01); *F01K 9/003* (2013.01); *F05D 2220/31* (2013.01)

(58) Field of Classification Search
CPC .......... F01K 11/02; F01K 9/003; F01D 25/32; F05D 2220/31
See application file for complete search history.

(56) References Cited

U.S. PATENT DOCUMENTS

| | | | |
|---|---|---|---|
| 3,537,265 A | 11/1970 | Brown | |
| 4,290,609 A | 9/1981 | Dumont | |
| 4,517,804 A * | 5/1985 | Ura | F28F 9/00 277/432 |
| 5,020,589 A * | 6/1991 | Viscovich | F28B 9/10 60/685 |
| 2003/0159444 A1 | 8/2003 | Zimron et al. | |
| 2012/0198845 A1 | 8/2012 | Maki et al. | |
| 2017/0268383 A1* | 9/2017 | Hirayama | F01K 13/02 |
| 2018/0187566 A1 | 7/2018 | Gaia et al. | |
| 2019/0292928 A1 | 9/2019 | Nogami et al. | |

FOREIGN PATENT DOCUMENTS

| | | |
|---|---|---|
| JP | S57 200603 A | 12/1982 |

* cited by examiner

*Primary Examiner* — Hoang M Nguyen
(74) *Attorney, Agent, or Firm* — Paul Frank + Collins P.C.

(57) ABSTRACT

The disclosure concerns a gland condenser skid system comprising a direct contact heat exchanger as gland condenser, configured to collect and condensate steam coming from a steam turbine sealing system, wherein the steam turbine sealing system is provided with an air buffering seal device, separating steam turbine shaft lubricating oil system from the steam turbine sealing system.

5 Claims, 3 Drawing Sheets

GLAND CONDENSER SKID SYSTEMS BY DIRECT CONTACT HEAT EXCHANGER TECHNOLOGY

TECHNICAL FIELD

The present disclosure concerns a gland condenser skid system including a gland condenser based on direct contact heat exchanger technology. Embodiments disclosed herein specifically concern improved thermodynamic machines such as steam turbines and/or engine generators or mechanical drive stations, wherein a direct contact heat exchanger is configured to act as gland condenser.

BACKGROUND ART

A gland condenser skid system is used to condense the steam coming from a steam turbine sealing system (also called gland seals system), in particular the steam that leaks past the first section of seals on the shaft of a steam turbine. Specifically, if the turbine exhausts into a vacuum system, it is necessary to inject sealing steam into the seals, in order to keep the low pressure end of the turbine from drawing in the atmosphere. This sealing steam from the low pressure end and the normal leakage from the high pressure end would tend to leak out and blow toward the bearing housing. In order to reduce the chance of this leakage causing an accumulation of water in the lube oil system, a gland condenser skid system is used to draw a very slight vacuum (typically 1 or 2 in-Hg) at the outer section of the shaft seals. Typically, gland condenser shell side pressure is 0.96 bara.

A gland condenser skid system includes a small heat exchanger to condense the steam and an evacuation device to extract not condensable fractions of the steam stream. Additionally, the gland condenser skid system also includes a silencer, piping, filters, valves, instrumentation and structural support.

The heat exchanger used to condense the steam coming from the steam turbine sealing system, also called gland condenser, is normally a water cooled shell and tubes heat exchanger, wherein cooling water runs through the tubes, and steam flows over the tubes (through the shell). At the bottom of the shell, where the condensate collects, an outlet is provided.

The use of shell and tubes heat exchangers as gland condenser is also required by API standard 612, the reference normative relevant to the steam turbine and its auxiliaries into Oil and Gas (Petroleum, Petrochemical and Natural Gas) market section. Its validity and application is world-wide recognized and its applicability in Oil & Gas technology can be used as direct insurance criteria for end users. According to API 612 normative, the condenser standard solution shall have a steel shell, brass or cupronickel tubes with nominal wall thickness of not less than 1.25 mm (0.050 in.) and a diameter of at least 15.88 mm (0.625 in.), and fixed tube sheets with water on the tube side. Alternative material choices are allowed depending on type of applied cooling water.

However, despite the high reliability of gland condensers configured as shell and tubes heat exchangers, this solution also has many drawbacks, namely:

a) large footprint and volume, high weight and cost;
b) low heat exchanging capacities;
c) limitation of equipment use, due to the overdesign level;

d) in case of tube bundle damage, tubes plugging needs to be applied, with a reduction of heat exchanging capacity;
e) the presence of a tube bundle involves increasing complexity of component; and consequently
f) high installation and maintenance costs.

Direct contact heat exchangers are not used as gland condensers, because this solution does not guarantee against any possible contamination of cooling fluid by sealing steam turbine oil. In fact, direct contact heat exchangers do not comply with the requirement of a full separation between cooling and process fluids.

SUMMARY

According to the present invention, it is proposed that direct contact heat exchangers are used as gland condensers for thermodynamic machines such as steam turbines and/or engine generators or mechanical drive stations, in particular used in Oil & Gas field. To this aim, a direct contact heat exchanger is used together with steam turbine control systems to avoid any possible contamination of cooling fluid by sealing steam turbine oil.

Thus, in one aspect, the subject matter disclosed herein is directed to a gland condenser skid system including a gland condenser based on direct contact heat exchanger technology, said gland condenser skid system being connected to a steam turbine provided with a seal buffering system to stop by air any possible contamination.

BRIEF DESCRIPTION OF THE DRAWINGS

A more complete appreciation of the disclosed embodiments of the disclosure and many of the attended advantages thereof will be readily obtained as the same becomes better understood by reference to the following detailed description when considered in connection with the accompanying drawings, wherein.

DETAILED DESCRIPTION OF EMBODIMENTS

According to one aspect, the present subject matter is directed to a gland condenser skid system comprising a direct contact heat exchanger as gland condenser.

According to another aspect, said gland condenser skid system being connected to a steam turbine provided with a seal buffering system to stop by air any possible contamination of the steam coming from the steam turbine sealing system and directed to the gland condenser.

Figure 1:
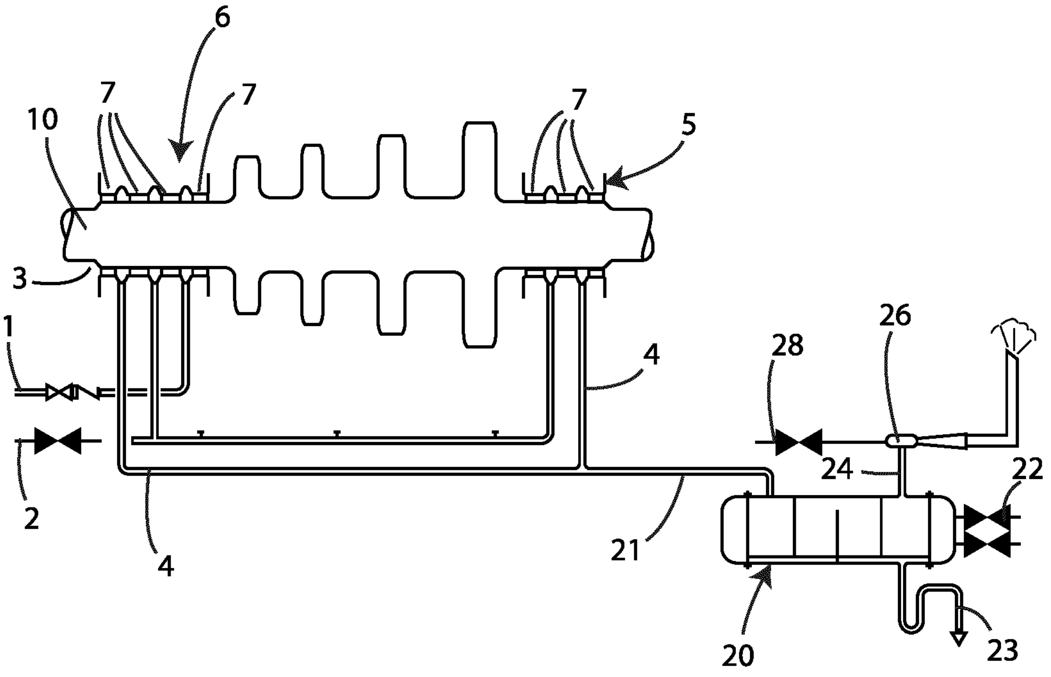
FIG. 1 illustrates a schematic view of a steam turbine sealing system and a relative gland condenser skid system, according to an exemplary embodiment of the present disclosure.

Referring now to the drawings, FIG. 1 shows a turbine shaft 10 provided with gland seals 5 and 6, each gland seal 5 and 6 comprising a plurality of sections 7 of seals. The turbine exhausting into a vacuum system, sealing steam is injected into the seals 5 and 6 through a steam line 2, in order to keep the low pressure end of the turbine from drawing in the atmosphere. A gland condenser 20 skid system is used to draw a very slight vacuum (typically 1 or 2 in-Hg) at the outer section 7 of the gland seals 5 and 6. Air from the atmosphere is also sucked into the outer section 7 of the gland seals 5 and 6 and is drawn towards the gland condenser 20 skid system through respective steam and air drain lines 4. FIG. 1 also illustrates an air buffering seals line 1, which is illustrated in detail in FIGS. 3 and 4.

Figure 2:
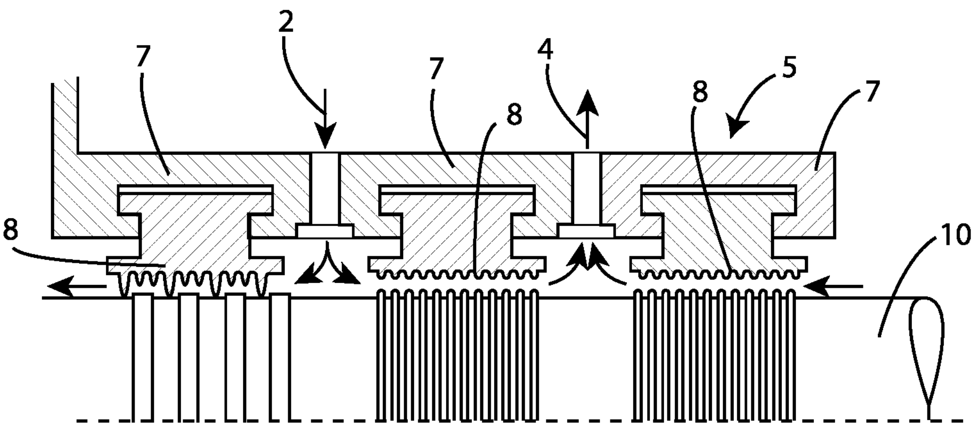
FIG. 2 illustrates a schematic view of a gland seal of a steam turbine sealing system according to an exemplary embodiment of the present disclosure.

FIG. 2 illustrates in detail the gland seal 5, wherein each section 7 is provided with a labyrinth seal 8. FIG. 2 also illustrates the connection of the cavities comprised between each section 7 and the shaft 10 respectively with the steam line 2 and with the steam and air drain line 4.

Figure 3:
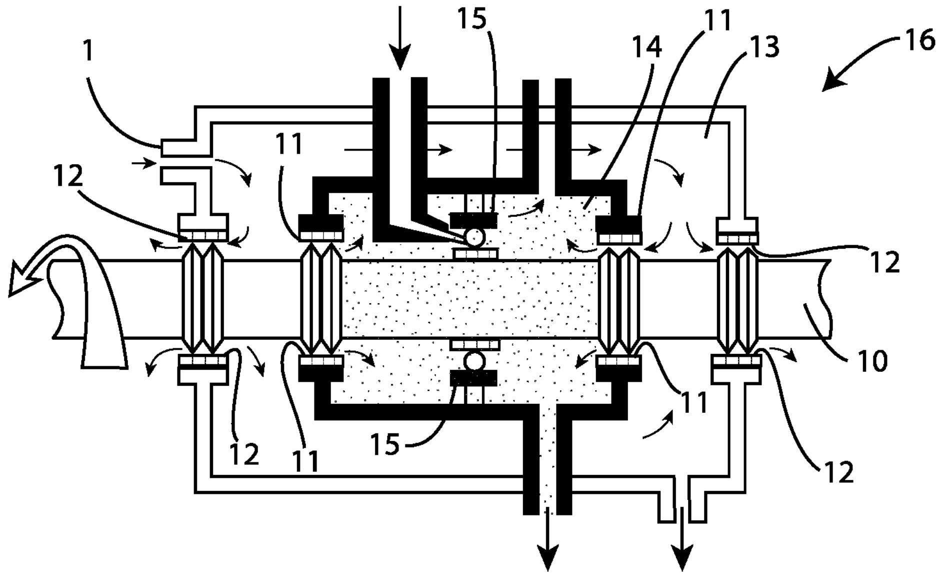
FIG. 3 illustrates a schematic view of a seal system air buffering seal device according to an exemplary embodiment of the present disclosure, arranged all around an oil seal for the bearing of a steam turbine shaft for coupling with a gland condenser system comprising a direct contact heat exchanger as gland condenser.

FIG. 3 illustrates an air buffering seal device, allowing to have an external barrier for oil system used to lubricate the bearings 15 of the steam turbine shaft 10. The figure shows labyrinth oil seals 11 keeping separate an internal oil cavity 14, containing lubricating oil, from an external air cavity 13, thus avoiding any oil leakage in the external air cavity 13. The external air cavity is provided with labyrinth air seals 12. This way, only residual air from external labyrinth seals 12 is directed to gland condenser and vented by an evacuation device 26, configured as a vacuum generator.

Figure 4:
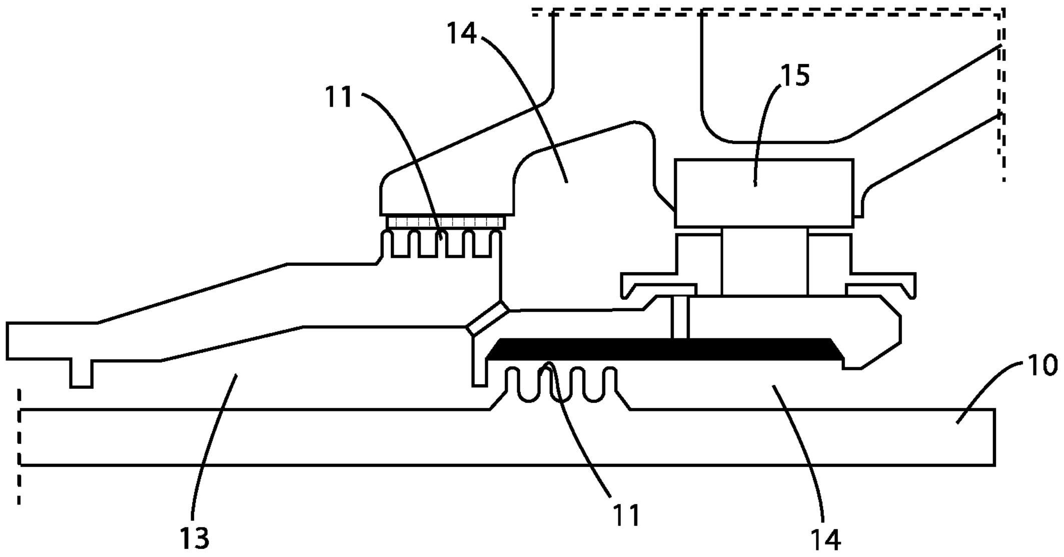
FIG. 4 illustrates a schematic view of an oil seal for the bearing of a steam turbine shaft according to an exemplary embodiment of the present disclosure, for coupling with a gland condenser system comprising a direct contact heat exchanger as gland condenser.

FIG. 4 shows an example of a double labyrinth oil seal solution, wherein a double oil cavity 14 is kept separate by respective air cavity 13 by means of labyrinth oil seals 11.

Figure 5:
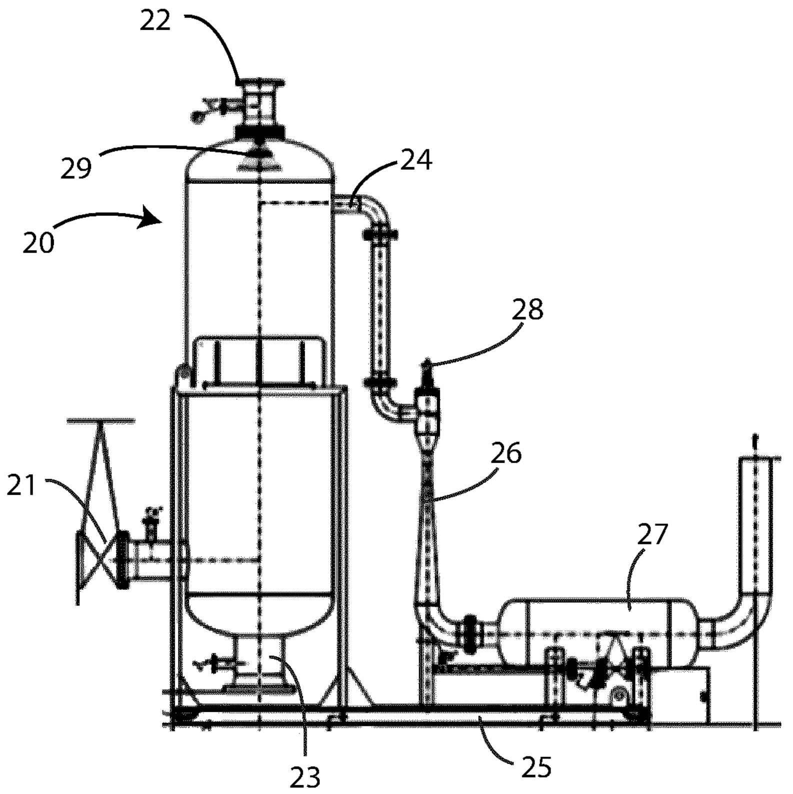
FIG. 5 illustrates a schematic view of a gland condenser system comprising a direct contact heat exchanger as gland condenser according to an exemplary embodiment of the present disclosure.
Figure 6:
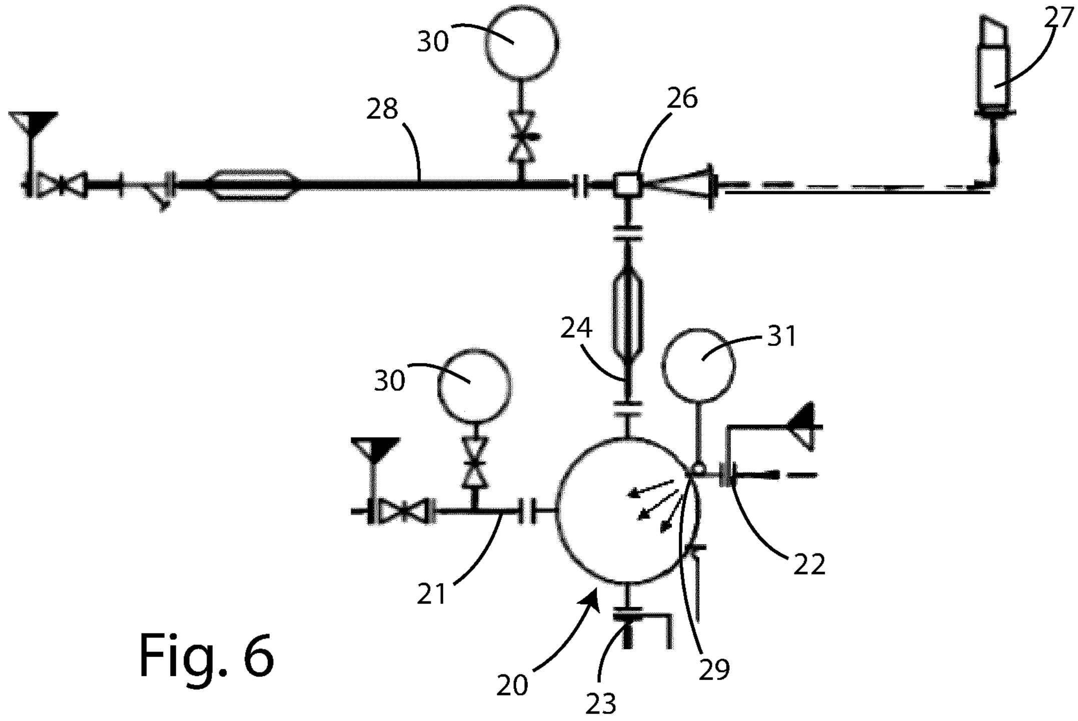
FIG. 6 illustrates a schematic view of a piping and instrumentation diagram (P&ID) of a gland condenser system comprising a direct contact heat exchanger as gland condenser.

Making reference to FIGS. 5 and 6, a gland condenser skid system according to an exemplary embodiment of the present disclosure comprises a direct contact gland condenser 20, provided with an inlet 21 for an air and steam mix flow from the gas turbine sealing system. On the top of the direct contact gland condenser 20 an inlet 22 is provided for water used to condensate steam through direct contact. To maximize its efficacy, water is sprayed through a spray nozzle 29. Condensate is collected at the bottom of the direct contact gland condenser 20, from a condensate outlet 23.

Residual steam, together with air, is drawn through an outlet 24, in the higher zone of the direct contact gland condenser 20, and directed by an evacuation device 26 to a silencer 27 and thereafter to the atmosphere. Finally, the evacuation device is a vacuum generator and in particular a Venturi steam-operated pump fed by motive steam from a steam inlet 28.

The gland condenser skid system comprises pressure indicators 30 and a temperature indicator 31 and is supported by a structure 25 made of steel.

The gland condenser skid system including a gland condenser based on direct contact technology involves many advantages over a gland condenser based on shell and tubes technology, including:

- Simpler Geometry and Easier Fabrication, since direct contact heat exchanger solution is based on a simple vessel in which condensation occurs. No tube bundle presence is needed.
- More Compact and flexible lay-out, since direct contact heat exchanger type has a higher efficiency then traditional shell and tubes layout. Depending on specific needs, a proper design can be developed by optimization of easy to determine parameters, such as vessel diameter, length and flow direction.
- Lower installation because of reduced footprint due to vertical layout and lower maintenance costs, since the tube bundle absence strongly reduces any possible vessel damage during its life.
- Performance reliability, since a simpler system is able to guarantee heat efficiency. Upgrading of performance can be solved by sprayer substitution or easy cleaning. Moreover, any permanent performance reduction due to tubes fouling is removed.
- Reliable and cost-effective production in a variety of Petrochemical applications, with cost benefit compared to shell and tube solution in the range of 15-30% depending on materials and size classes.
- Full Materials applicability, ranging from carbon steel to stainless steel to Cu/Ni steel, depending on specific water typology.
- Compliance with major design and Fabrication codes, since pressure vessels codes can be applied without limitation.
- P&ID of gland system fully maintained vs Standard Approach, since no outlet cooling water line is necessary.

While aspects of the invention have been described in terms of various specific embodiments, it will be apparent to those of ordinary skill in the art that many modifications, changes, and omissions are possible without departing form the spirt and scope of the claims.

The invention claimed is:

1. A gland condenser system comprising a direct contact heat exchanger, configured to collect and condensate steam coming from a steam turbine sealing system, wherein the direct contact heat exchanger is a cylindrical column with a vertical axis, comprising an inlet for an air and steam mix flow from the steam turbine sealing system, in the lower part of the column and an inlet for cooling water at the top of the column, a condensate outlet at the bottom of the column and a residual steam and air outlet in the upper part of the column.

2. The gland condenser skid system according to claim 1, wherein the inlet for cooling water is provided with a spray nozzle.

3. The gland condenser skid system according to claim 1, wherein the residual steam and air outlet is connected to an evacuation device, configured as a vacuum generator.

4. The gland condenser skid system according to claim 3, wherein the evacuation device is a Venturi steam-operated pump fed by motive steam from a steam inlet.

5. The gland condenser skid system according to claim 3, wherein the evacuation device is connected downstream to a silencer.

* * * * *